United States Patent [19]
Ai et al.

[11] Patent Number: 4,754,016
[45] Date of Patent: Jun. 28, 1988

[54] PROCESS FOR PREPARING POLYAMIDE WITH ORGANIC PHOSPHINE/ORGANIC DISULFIDE MIXTURE CONDENSING AGENT

[75] Inventors: Hideo Ai; Akihiko Ikeda; Yoshio Matsuoka, all of Fuji, Japan

[73] Assignee: Asahi Kasei Kogyo Kabushiki Kaisha, Japan

[21] Appl. No.: 869,989

[22] Filed: Jun. 3, 1986

[51] Int. Cl.$^4$ ............................................. C08G 69/28
[52] U.S. Cl. ...................................... 528/336; 528/23; 528/26; 528/27; 528/28; 528/38; 528/41; 528/125; 528/126; 528/179; 528/188; 528/223; 528/229; 528/337; 528/348; 528/351; 528/353; 528/373

[58] Field of Search ............... 528/336, 125, 126, 179, 528/188, 223, 229, 337, 348, 351, 353, 23, 373

[56] References Cited
U.S. PATENT DOCUMENTS
2,856,387  10/1958  Jacobson et al. ................... 528/337
4,414,383  11/1983  Conciatori et al. ................. 528/336

FOREIGN PATENT DOCUMENTS
1127731  6/1986  Japan .

Primary Examiner—Harold D. Anderson
Attorney, Agent, or Firm—Berman, Aisenberg & Platt

[57] ABSTRACT

A process for preparing a polyamide which comprises polycondensing a dicarboxylic acid and a diamine by using a combination of at least one phosphine and at least one disulfide as the condensing agent.

21 Claims, No Drawings

PROCESS FOR PREPARING POLYAMIDE WITH ORGANIC PHOSPHINE/ORGANIC DISULFIDE MIXTURE CONDENSING AGENT

BACKGROUND OF THE INVENTION

1. Field of the Invention

This invention relates to an improved method for preparing a polyamide. Morre particularly, this invention relates to the method using a specific condensing agent.

2. Description of the Prior Art

As methods for preparing polyamide, high temperature melt-polycondensation methods have been proposed (see, for example, Carothers et al.; U.S. Pat. No. 2,130,523), and these methods have been widely employed in the production of polyamides, such as Nylon.

And as particularly described in "Condensation Polymers by Interfacial and Solution Methods" (Morgan; Interscience, New York, 1965), Morgan and his school of E. I. Du Pont de Nemours & Company (U.S.A.) made a systematic study on interfacial condensation polymerization and low temperature solution polymerization using an acid chloride for preparing polyamides, and established the simple methods for preparing polyamides at room temperature in 1958. The methods have been widely used for preparing polyamides, and industrialized to produce polyamdies, such as Nomex ® and Kevlar. ®

Further, various studies for synthesizing polyamides under mild and neutral conditions have been made, and some of the methods, such as a process through an active ester intermediate, have been reported [see, for example, Ueda et al.; Journal of Polymer Science Polymer Chemistry Edition Vol. 23, 1607–1613 (1985)].

Further, some of the methods using an organic condensing agent have been reported [see, for example, Ogata et al.; Polymer Journal Vol. 14, No. 7, pp 571–574 (1982)].

However, Carothers' method are subject to problems, such as generation of a gel portion because of its high temperature, and cannot be used to prepare high melting point polyamides or low thermal resistance polyamides.

And, Morgan's methods are subject to problems, such as generation of toxic gas and corrosion of apparatus, because Morgan's methods are carried out under strong acidic conditions. Further, disposal of a large amount of produced acidic waste water is also a big problem. Moreover, the products by Morgan's methods are usually contaminated with several hundred ppm of chlorine because of a certain side reaction. Furthermore, polyamides produced by Morgan's methods contain chloride ions as impurities, and it is very difficult to decrease them to several ppm or less by an ordinary process.

Polyamides and polymers produced from the polyamides, such as polyimides and polyamide-imides, have been widely used as materials for electric or electronic articles such as insulators, flexible print circuit boards and molding materials. Further, these polymers are newly used for coating materials for semi-conductors, interlayer insulation materials for LSI and thermal resistant films. In these applications, even a trace amount of chloride ion brings about a serious problem of corrosion or lowering of the capability of the device.

Methods proposed by Ueda et al. also have problems; complicated operations are required to isolate the intermediate. Further, since the intermediate is produced under strongly acidic conditions, the methods have not yet been industrialized.

Methods proposed by Ogata et al., using triphenylphosphine and polyhalo-compounds as the condensing agent, also have problems, such as low solubility of produced polymers because of using pyridine as a solvent. Further, since mild and neutral reaction conditions cannot be attained because of generation of hydrochloric acid, these methods have not yet been industrialized.

Accordingly, a new process which can be carried out under mild and neutral conditions and can produce polyamides having no undesirable impurities, such as chloride ions, is desired.

SUMMARY OF THE INVENTION

To overcome the described problems, the inventors of the present invention researched and conceived of using a dehydrating condensing agent which generates neither strong acids nor strong bases in the reaction of preparing polyamides. The inventors continued the research regarding dehydrating condensing agents, and found that combinations of phosphines and disulfides are satisfactory.

The combination of phosphines and disulfides is known as a dehydrating condensing agent used in forming peptides from amino acids [see, for example, Mukaiyama et al.; Journal of synthetic Organic Chemistry, Japan Vol. 29, No. 9, pp 848–864 (1971)]. However, the process for forming peptides is completely different from the process for preparing polyamides of the present invention. The peptides are formed by bonding an amino acid or an oligopeptide one by one. On the other hand, polyamides are prepared by polycondensing dicarboxylic acids and diamines according to the present invention.

The process for preparing polyamides disclosed in the present invention comprises polycondensing a dicarboxylic acid and a diamine by using a combination of phosphines and disulfides as the condensing agent.

DETAILED DESCRIPTION OF THE INVENTION

As methods for polycondensing dicarboxylic acid diamines, melt polycondensation, interfacial polycondensation or solution polycondensation can be employed in this invention. Of them, solution polycondensation is preferred in view of the simplicity of isolating polyamides. In this invention solution polycondensation is defined as a condensation reaction carried out in a solvent which can dissolve both monomers and condensing agents.

Various solvents are employed in solution polycondensation, and aprotic solvents are preferred because the possibility of side reactions is low.

Of the aprotic solvents, the aprotic polar solvents are preferable. Exemplary aprotic polar solvents include dialkylamide compounds, such as N,N-dimethylacetamide and N,N-dimethylformamide; N-alkyllactams, such as N-methylpyrrolidone; hexaalkylphosphorictriamides, such as hexamethylphosphorictriamide; lactones, such as γ-butyrolactone; cyclic ethers, such as tetrahydrofuran and dioxane; and sulfoxides, such as dimethyl sulfoxide.

Other aprotic solvents are optionally used, for example, ethers, such as diethyl ether; esters, such as ethyl acetate; ketones, such as acetone, methyl ethyl ketone, methyl isobutyl ketone, cyclopentanone and cyclohexanone; nitriles, such as acetonitrile; chlorine-containing hydrocarbons, such as chlorobenzene, chloroform, methylene chloride, 1,2-dichloroethane and 1,1,1-trichloroethane; tetraalkyl ureas; and pyridines.

Various phosphines can be employed as one component of the condensing agent in this invention. For example, phosphines of formula (I),

wherein each of $R_1$, $R_2$ and $R_3$ is independently a $C_{1-20}$ alkyl group, a $C_{6-20}$ aryl group, a $C_{7-20}$ arylalkyl group, a $C_{1-20}$ heterocyclic (e.g. ring-nitrogen-containing aromatic) group or a substituted group thereof having at least one substituent selected from the group consisting of $-OZ_1$, $-C\equiv N$ and $-NZ_2Z_3$, wherein each of $Z_1$, $Z_2$ and $Z_3$ is independently a $C_{1-8}$ alkyl group or a $C_{6-14}$ aryl group, can preferably be used.

Preferable examples of groups as each of $R_1$, $R_2$ and $R_3$ include, such as methyl, ethyl, propyl, hexyl, octyl, stearyl, phenyl, tolyl, naphthyl, anthracyl, pyridyl, quinolyl, benzoxazolyl, benzothiazolyl, 2-methoxy ethyl, 2-(2-methoxyethyl)ethyl, 2-cyanoethyl, 2-dimethylaminoethyl, 3-dimethylamino-1-propyl and 2-methylphenylaminoethyl.

Preferable examples of phosphines represented by formula (I) include tri-n-butylphosphine, triphenylphosphine, diethylphenylphosphine, tris(2-cyanoethyl)phosphine, tris(4-methylphenyl)phosphine, tri-n-octylphosphine, dimethyl(4-pyridyl)phosphine, dipropylanthracylphosphine, methylhexyl(2-quinolyl)phosphine, tris(2-benzoxazolyl)phosphine, tris(2-benzothiazolyl)-phosphine, dimethylstearylphosphine, diethyl(2-naphthyl)phosphine, tris(2-methoxyethyl)phosphine and tris(2-dimethylaminoethyl)phosphine.

Various disulfides can be employed as the other component of the condensing agent in this invention, as far as having no protic group, such as amino group, carboxylic acid group, sulfonic acid group, hydroxy group, mercapto group, and phosphoric acid group. For example, the disulfides of formula (II),

A-S-S-A'     (II)

wherein each of A and A' is independently a $C_{1-20}$ hydrocarbon group or $C_{1-20}$ heterocyclic group, can be employed.

When aromatic disulfides are used, polyamides can be produced at lower temperatures and in a shorter period of time, than when aliphatic disulfides are used.

Preferable examples of aromatic groups as each of A and A' in formula (II) include groups such as phenyl, tolyl, naphthyl, anthracyl and benzyl.

Preferable examples of the aromatic disulfides include diphenyl disulfide, ditoluyl disulfide and dibenzyl disulfide.

Further, when aromatic disulfides, substituted by an electron attractive group, such as a nitro group, nitrile group, carbonyl group, sulfonyl group and halogen, are used, polyamides can be produced at lower temperatures and in high yields.

Preferable examples of aromatic disulfides, substituted by an electron attractive group, include bis-o-nitrophenyl disulfide, bis(2,4-dinitrophenyl)disulfide, 1,1'-bis(4-carboethoxynaphthyl)disulfide, bis(4-phenylsulfonylphenyl)disulfide, bis(2,4,5-trichlorophenyl)disulfide, bispentachlorophenyl disulfide and bis(2-benzaminophenyl)disulfide.

Moreover, when nitrogen-containing heterocyclic aromatic disulfides are used, polyamides can be produced at much lower temperatures and in better yields.

Preferable examples of nitrogen-containing heterocyclic aromatic groups, as each of A and A' in formula (II), include groups, such as pyridyl, quinolyl, benzoxazolyl, pyrimidyl, imidazolyl, tetrazolyl, benzothiazolyl, benzimidazolyl and a substituted group thereof having at least one substituent selected from the group consisting of nitro, nitrile, a $C_{1-12}$ acyl, a $C_{1-12}$ sulfonyl and a halogen.

Preferable examples of the disulfides of this type include 2,2'-dipyridyl disulfide, 2,2'-di-(5-nitropyridyl)-disulfide, 2,2'-dibenzothiazolyl disulfide, 2,2'-dibenzimidazolyl disulfide, 2,2'-dibenzoxazolyl disulfide, 2,2'-diquinolyl disulfide, 2,2'-bis-(3-phenylindazolyl)disulfide, 2,2'-bis(4-phenylthiazolyl)disulfide, 4,4'-dipyridyl disulfide and 2,2'-dipyrimidyl disulfide.

Various dicarboxylic acids corresponding to the desired polyamides can be employed in this invention. For example, aliphatic and alicyclic dicarboxylic acids can be used, and preferable examples of these acids include oxalic acid, malonic acid, succinic acid, glutaric acid, adipic acid, pimelic acid, suberic acid, azelaic acid, sebacic acid, maleic acid, fumaric acid, hexahydrophthalic acid and 4-Δ-1,2-cyclohexenedicarboxylic acid.

When aromatic dicarboxylic acids are used, polyamides having high thermal resistance can be produced. Preferable examples of the aromatic dicarboxylic acids include isophthalic acid, terephthalic acid, 2,6-naphthalenedicarboxylic acid, 1,4-naphthalenedicarboxylic acid, methylterephthalic acid, biphenyl-2,2'-dicarboxylic acid, diphenylmethane-4,4'-dicarboxylic acid, diphenylether-4,4'-dicarboxylic acid, diphenylsulfone-4,4'-dicarboxylic acid and 1,1,1,3,3,3-hexafluoro-2,2'-bis(4-carboxyphenyl)propane.

Further, when the dicarboxylic acids of formula (III):

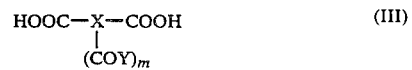

wherein
X is a group having a valence of (m+2), and is a $C_{6-20}$ carbocyclic group, a $C_{3-20}$ heterocyclic group, a $C_{2-20}$ alkyl group or a $C_{2-20}$ alkenyl group;
Y is $-OR$ or $-NRR'$, wherein each of R and R' is independently a $C_{5-20}$ carbocyclic group, a $C_{1-20}$ heterocyclic group, a $C_{1-20}$ hydrocarbon group or a substituted group thereof having at least one substituent selected from the group consisting of $-OW$, wherein W is a $C_{1-12}$ hydrocarbon group, $C_{2-12}$ acyl group, a $C_{2-12}$ acyloxy group, a $C_{2-1}$ acylamino group, a $C_{2-12}$ dialkylamino group, $-SW$, wherein W is the same as defined above, a $C_{2-12}$ acylthio group or a $C_{3-12}$ group having at least one silicon atom; m is 1 or 2; and
$-COY$ can be attached to any of the positions ortho, peri, β and γ with respect to the $-COOH$ group, are used, produced polyamides can change to polyamideimides or polyimides having high thermal resistance after heat treatment.

Preferable examples of trivalent C6–20 carbocyclic groups as X include groups, such as

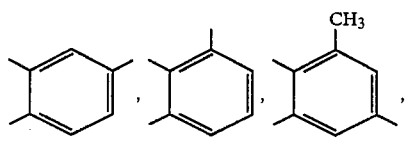

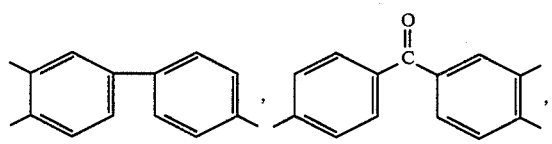

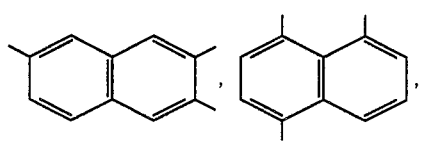

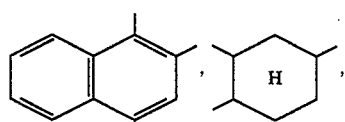

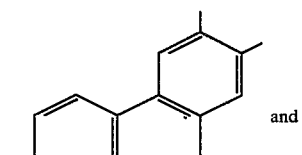

and

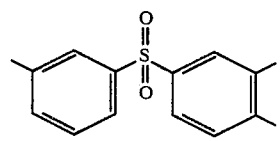

Preferable examples and tetravalent C6–20 carbocyclic groups as X include groups, such as

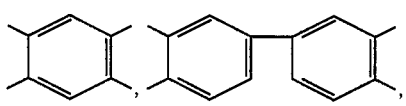

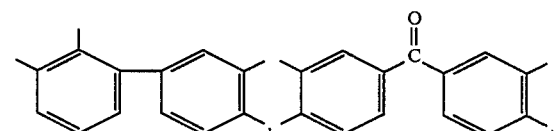

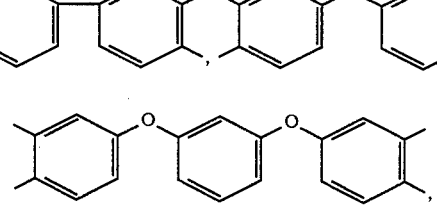

-continued

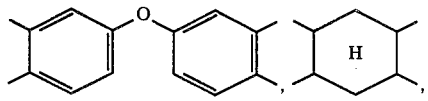

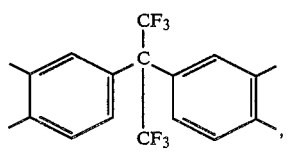

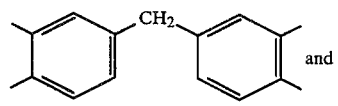

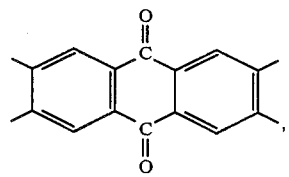

and

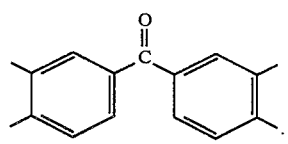

and the following groups are more preferred in view of the use as a polyimide precursor:

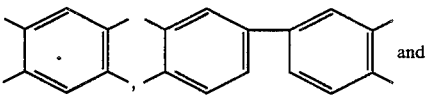
and

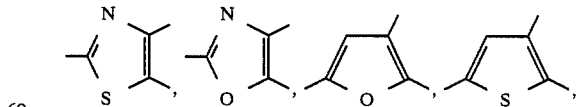

Preferable examples of trivalent C3–20 heterocyclic groups as X include groups, such as

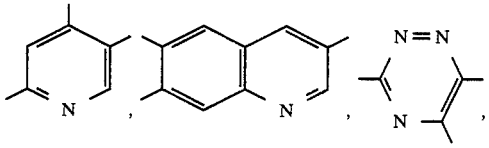

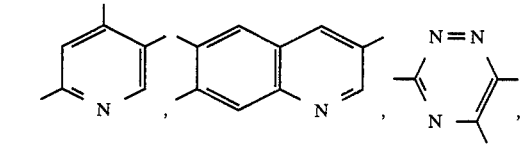

-continued

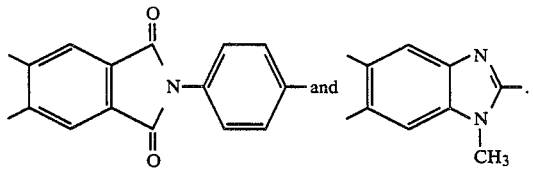

Preferable examples of tetravalent $C_{3-20}$ heterocyclic groups as X include groups, such as

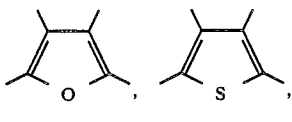

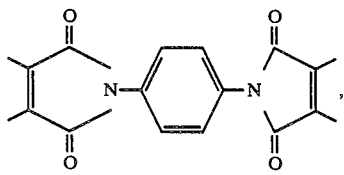

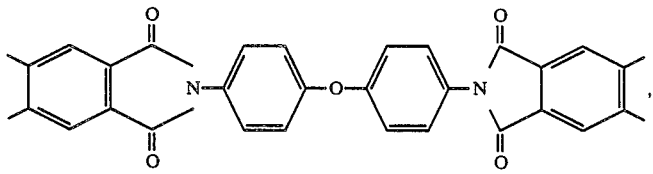

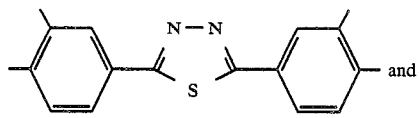

Preferable examples of $C_{2-20}$ alkyl groups and $C_{2-20}$ alkenyl groups as X include groups, such as

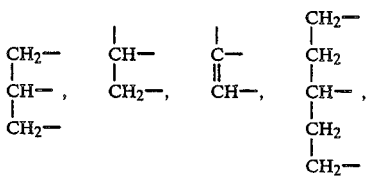

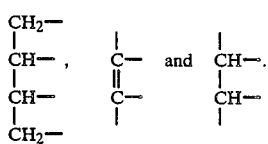

Preferable examples of $C_{5-20}$ carbocyclic as R and R' include phenyl, tolyl, naphthyl, cyclohexyl and cyclopentenyl.

Preferable examples of $C_{1-20}$ heterocyclic groups, as R and R' include 1-methyl-5-tetrazolyl, 1-methyl-3-(1,2,4-triazolyl), pyridyl, quinolyl, 2-thiophenyl and 2-furanyl.

Preferable examples of $C_{1-20}$ hydrocarbon as R and R' include methyl, ethyl, isopropyl, allyl, n-butyl, hexyl, homoallyl, 2-propynyl, lauryl, stearyl and cinnamyl.

As R and R', $C_{5-20}$ carbocyclic groups, $C_{1-20}$ heterocyclic groups or $C_{1-20}$ hydrocarbon groups, each having at least one substituent selected from the group consisting of —OW, wherein W is a $C_{1-12}$ hydrocarbon group, a $C_{2-12}$ acyl group, a $C_{2-12}$ acyloxy group, a $C_{2-12}$ acylamino group, a $C_{2-12}$ dialkylamino group, —SW, wherein W is the same as defined above, a $C_{2-12}$ acylthio group; and a $C_{3-12}$ group having at least one

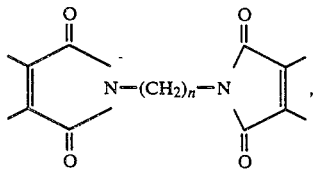

(n: an integer from 2 to 6)

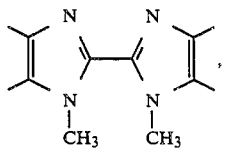

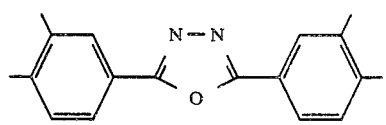

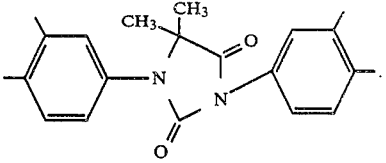

silicon atom can be used.

Exemplary substituted $C_{5-20}$ carbocyclic groups include the groups represented by formulae $P^1$, each having at least one substituent selected from the group represented by formulae $Q^1$:

[$P^1$]

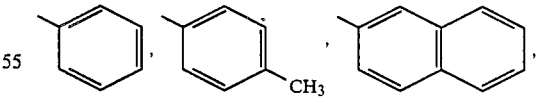

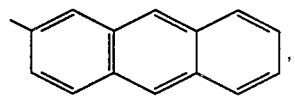

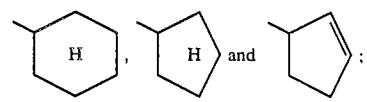

[$Q^1$]

$-O-Q^2$, $-\overset{O}{\underset{\|}{C}}-Q^2$, $-O-\overset{O}{\underset{\|}{C}}-Q^2$, $-\overset{O}{\underset{\|}{C}}-OQ^2$, $-\overset{H}{\underset{|}{N}}-\overset{O}{\underset{\|}{C}}-Q^2$, $-\overset{Q^3}{\underset{|}{N}}-Q^3$, $-S-Q^2$, $-\overset{O}{\underset{\|}{S}}-Q^2$, $-\overset{O}{\underset{\|}{\underset{\|}{S}}}-Q^2$, $-O-\overset{Q^4}{\underset{\underset{Q^4}{|}}{Si}}-Q^4$, $-O-\overset{OQ^5}{\underset{\underset{OQ^5}{|}}{Si}}-Q^4$, $-\overset{OQ^5}{\underset{\underset{OQ^5}{|}}{Si}}-OQ^4$ and $-\overset{OQ^5}{\underset{\underset{OQ^5}{|}}{Si}}Q^4$, wherein each of $Q^2$ and $Q^3$ is

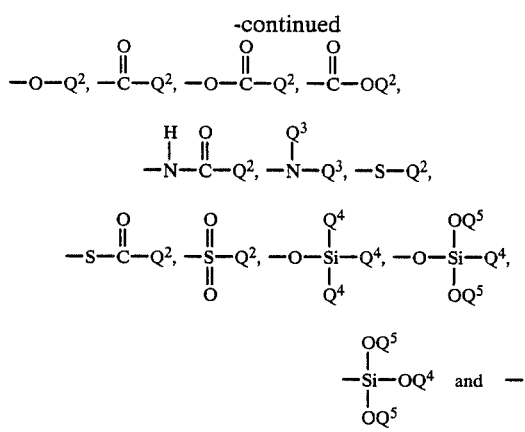

Exemplary substituted $C_{1-20}$ heterocyclic groups include the groups represented by formulae $P^2$, each having at least one substituent selected from the group represented by formula $Q^1$, as described above:

[P²]

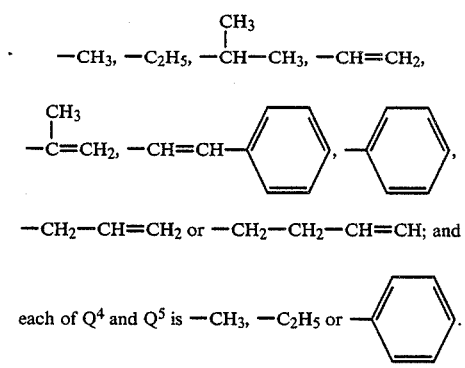

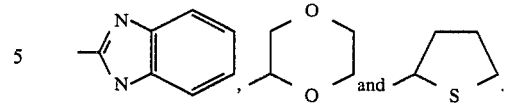

Exemplary substituted $C_{1-20}$ hydrocarbon groups include the groups represented by formulae $P^3$, each having at least one substituent selected from the group represented by the formula P1 as described above:

[P³]

$-(CH_2)_l-CH_3$, $-\overset{CH_3}{\underset{|}{CH}}=CH_3$, $-CH_2-CH=CH_2$, (l: an integer from 0 to 6)

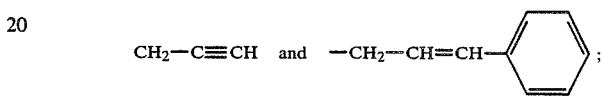

Preferable examples of Y include methoxy, ethoxy, isopropoxy, phenoxy, allyloxy, 2-pyridyloxy, 4-pyridyloxy, furfuryloxy, 2-methacryloxyethyloxy, 2,3-dimethoxypropyloxy, acrylaminomethyloxy, 2-methacrylthioethyloxy, N-phenyl-N-(3-trimethyl-silyl)-propylamino and N-methyl-N-(4-dimethylamino)-phenylamino.

Preferable examples of dicarboxylic acids represented by formula (III) include trimellitic acid 2-ethyl ester, trimellitic acid 1-diethylamide, pyromellitic acid 2,5-dimethyl ester, mixture of pyromellitic acid 2,4-diethyl ester and pyromellitic acid 2,5-diethyl ester, naphthalene-1,4,5,8-tetracarboxylic acid 1,5-diethyl ester, naphthalene-2,3,6,7-tetracarboxylic acid 2,6-bis-dimethylamide, 3,3',4,4'-diphenyltetracarboxylic acid 3,4'-diisopropyl ester, 1,1,1,3,3,3-hexafluoro-2,2-bis(3,4-dicarboxyphenyl)propan ediethyl ester, benzophenone-3,3',4,4'-tetracarboxylic acid diethyl ester, bis(3,4-dicarboxyphenyl)ether dimethyl ester, bis(3,4-dicarboxyphenyl)sulfone diphenyl ester, ethylenetetracarboxylic acid diethyl ester, 2,3-dicarboethoxy-1,4-butanedicarboxylic acid, 3,4-dicarbomethoxyadipic acid, 3-carboxyglutaric acid 1-ethyl ester,

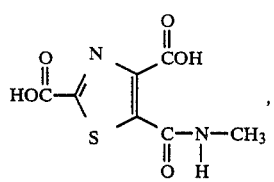

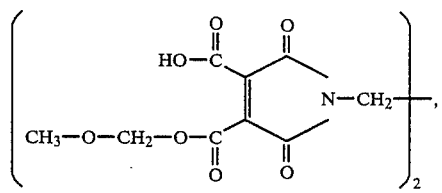

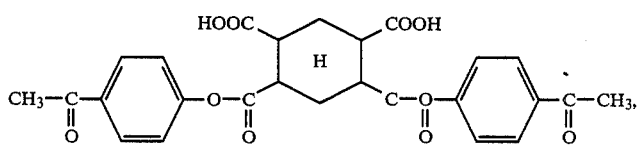

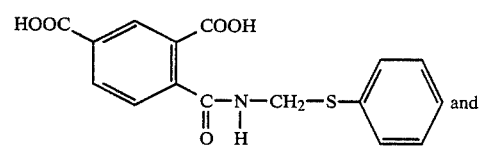

-continued

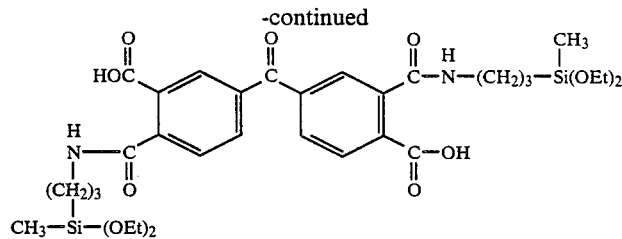

Polyimides and polyamide-imides which are prepared from polyamides produced by using the described specific dicarboxylic acids show higher thermal resistance and stronger mechanical properties than those prepared with conventional polyimides and polyamideimides using acid chlorides.

Moreover, when the dicarboxylic acids having photosensitive groups, such as carbon-carbon double bond, are used as a dicarboxylic acid component in this invention, the polyamides obtained become sensitive to radiation, such as visible light, ultraviolet rays, X-rays and electron beams. Therefore, it is possible to form an image insoluble in a solvent by exposing the polyamides to these radiations. Preferable dicarboxylic acids of this type may have an α,β-unsaturated carboxylic acid structure or an α,β-unsaturated ketone structure. Preferable examples of the dicarboxylic acids having photosensitive groups include 4-carboxycinnamic acid, p-phenylenediacrylic acid, trimellitic acid allyl, trimellitic acid (2-acryloxyethyl), 4,4'-dicarboxychalcone, di(4-carboxybenzylidene)acetone and the mixtures thereof.

When the photosensitive group is attached to the position ortho or peri to the carboxyl group through a carboxylic acid ester bond, the polyamides prepared are precursors of photosensitive polyimides and have superior properties, such as workability, heat resistance and electric pressure resistance. Preferable examples of the specific dicarboxylic acids include pyromellitic acid 1,4-diallyl, pyromellitic acid 1,4-di(2-acryloxyethyl), mixture of pyromellitic acid 1,4-di(2-methacryloxyethyl) and pyromellitic acid 2,4-di(2-methacryloxyethyl), benzophenone-3,3',4,4'-tetracarboxylic acid diallyl, mixture of benzophenone-3,3',4,4'-tetracarboxylic acid 3,3'-di(2-methacryloxyethyl), benzophenone-3,3',4,4'-tetracarboxylic acid 4,4'-di(2-methacryloxyethyl) and benzophenone-3,3',4,4'-tetracarboxylic acid 3,4'-di(2-methacryloxyethyl), benzophenone-3,3',4,4'-tetracarboxylic acid 3,4'-di(2-methacrylaminoethyl), biphenyl-3,3',4,4'-tetracarboxylic acid 3,3'-di(2-acryloxyethyl) the compound having the following formula:

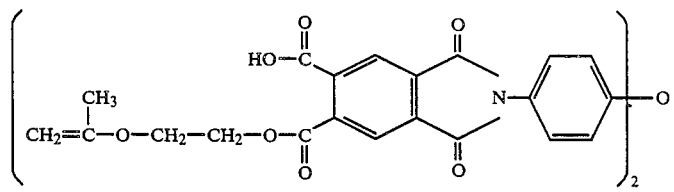

and the mixtures thereof.

As the dicarboxylic acid component, one or more dicarboxylic acids can be used in this invention.

Various diamines corresponding to the desired polyamides, can be employed in this invention. For example, aliphatic and alicyclic diamines can be used, and preferable examples of these diamines include ethylenediamine, 1,3-propylenediamine, 1,2-propylenediamine, 1,4-butanediamine, 2,2-dimethyl-1,3-propylenediamine, hexamethylenediamine, 1,4-cyclohexanediamine, 3-methoxyhexamethylenediamine, decamethylenediamine, bis(3-aminoprypyl)sulfide, bis(4-aminocyclohexyl)methane and piperazine.

When aromatic diamines are used, polyamides having high thermal resistance can be produced. Preferable examples of the aromatic diamines include meta-phenylenediamine, para-phenylenediamine, 4,4'-diaminodiphenylpropane, 4,4'-diaminodiphenylmethane, 3,3'-diaminodiphenyl sulfone, 3,4'-diaminodiphenyl sulfone, 4,4'-diaminodiphenyl sulfide, benzidine, 4,4'-diaminodiphenyl ester, 1,5-diaminonaphthalene, metatoluidine, 3,3'-dimethylbenzidine, 3,3'-dimethoxybenzidine, 3,4'-diaminodiphenyl ether, ortho-toluidine sulfone, phenylindanediamine, 1,1,1,3,3,3-hexafluoro-2,2-bis(4-aminophenyl)propane, 1,1,1,3,3,3-hexafluoro-2,2-bis(4-aminophenoxyphenyl)propane, bis(4-aminophenoxyphenyl)sulfone, 1,4-bis(4-aminophenoxy)benzene, 1,3-bis(4-aminophenoxy)benzene, 9,9-bis(4-aminophenyl)fluorene, 4,4'-diaminobenzanilide, bis(4-β-amino-t-butylphenyl)ether, and meta-xylylendeiamine.

To improve the adhesive property of the polyamides, diamines having at least one silicon atom can be employed. Preferable examples of the diamines include compounds having the following formulae:

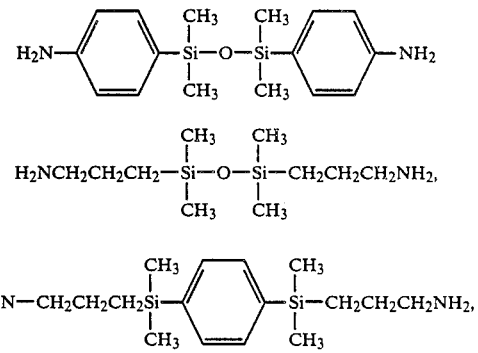

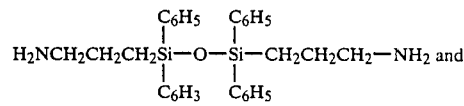

mixtures thereof.

The compounds having the following formulae are also preferable.

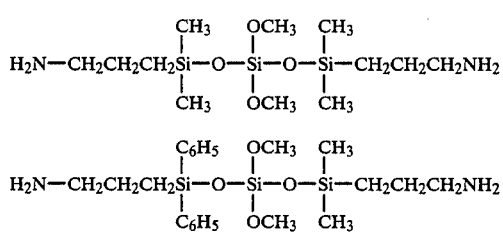

As the diamine component, one or more diamines can be used in this invention.

Conventional reaction conditions for polycondensing dicarboxylic acids and diamines can be employed in this invention. Though the reaction temperature is not limited so far as the reaction occurs, it is preferably from $-20°$ C. to $80°$ C. in view of the reaction rate and by-products, and more preferably from $-10°$ C. to $30°$ C. Although the molar ratio of phosphines and disulfides is not limited, it is preferably around 1.0, but can be varied from 0.2 to 5. The amount of condensing agent is as follows. When the dicarboxylic acids are in excess with respect to the diamines, the molar ratio of the combination of phosphines and disulfides (as the condensing agent) to diamines is 2 or more, and preferably from 2 to 3. When the diamines are in excess with respect to the dicarboxylic acids, the molar ratio of the combination of phosphines and disulfides to dicarboxylic acids is 2 or more, and preferably from 2 to 3. However, there is no problem when an excess amount of the combination of phosphines and disulfides is used. The amount of solvent preferably ranges from 500 ml to 10 l per mole of the combination of phosphines and disulfides. The reaction time is preferably from 10 minutes to 100 hours, and more preferably from one hour to 24 hours. It is preferable to use additives, such as di-p-anisylmercury and 2,3-dihydropyran, to enhance the reaction rate. Although not limited, it is preferable to add phosphines to the mixture of solvents, dicarboxylic acids, diamines and disulfides to obtain posphines having high molecular weight and high stability. Also it is preferable to add phosphines to the mixture of solvents, dicarboxylic acids and disulfides or to add disulfides to the mixture of solvents, dicarboxylic acids and phosphines at first in part, and then add diamines to the reaction mixture.

The molar ratio of dicarboxylic acids to diamines is preferably around 1.0, but can be from 0.7 to 1.3 depending on the molecular weight of the desired polyamides. To control the molecular weight of the polyamides, monofunctional alcohols or amines may be added to the reaction mixture. To stop the reaction, conventional methods, such as dilution of the reaction mixture, isolation of the polyamides produced, and inactivation of the active terminal groups with alcohols, can be employed in this invention.

The polyamides produced according to the methods of the present invention can be isolated from the solvents, remaining condensing agent, phosphine oxides and mercaptans produced from condensing agents by using conventional methods, such as washing, reprecipitation with water or organic solvents, filtration and distillation, depending on the properties of polyamides and the kind of the condensing agents used.

In the reaction of this invention, the combination of phosphines and disulfides works as a dehydrating condensing agent to produce phosphine oxides and mercaptans together with polyamides as set forth below:

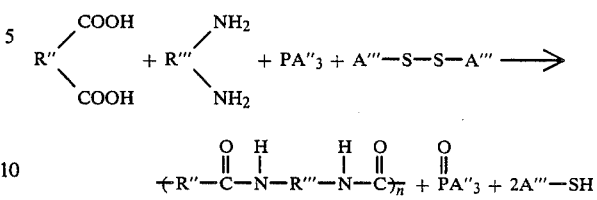

wherein each of R″ and R‴ is a divalent organic group and each of A″ and A‴ is a monovalent organic group. In this reaction, an acylphosphonium-salt seems to be the intermediate as described in the Mukaiyama's paper [see Journal of Synthetic Organic Chemistry, Japan, Vol. 29, No. 9, 856 (1971)].

The carboxylic acid terminal groups of the polyamides have thiol ester structures produced by the half unit of disulfides. These terminal groups can be converted to any structure of esters or amides, by using the alcohols or amines required, both in the reaction and after isolation.

Polyamides, having ester terminal groups, are superior in the stability in polar solvents, as compared with conventioinally-obtained counterparts. Polyamides, having amide terminal groups can provide polyimides or polyamide-imides which are superior in the thermal resistance and mechanical properties, as compared with conventionally-obtained counterparts. The amide terminals can be converted to imide structures at the cyclization of the polyamide.

According to the present invention, polyamides can be prepared under mild and neutral conditions. Further, problems, such as corrosion of apparatus, difficulty of recovering solvents and disposal of an enormous volume of generated acidic water can be overcome. Further, polyamides which contain very few chlorine ions and are suitable for use of electronic articles can be easily obtained by this invention. Moreover, the polyamides obtained by this invention can convert the terminal groups to useful structures.

The following Examples are given to illustrate the present invention more specifically. However, it should be understood that the invention is in no way limited by these Examples.

EXAMPLE 1

Into a 300 ml separable flask, 16.6 g of isophthalic acid, 19.8 g of 4,4′-diaminodiphenylmethane, 52.4 g of triphenylphosphine and 66.4 g of 2,2′-dibenzothiazolyl disulfide were placed, and 150 ml of N-methylpyrrolidone was added to the mixture with stirring under cooling in an ice bath. Following stirring for 24 hours at 23° C., the solution was added dropwise to 20 l of ethanol under stirring to give precipitates. The precipitates were separated by filtration, washed with ethanol and dried under vacuum to give 21.0 g of a white powder. The inherent viscosity ($\eta$) of the product measured in conc. sulfuric acid at a concentration of 0.5 g/dl at 30° C. was 0.95 dl/g. The weight-average molecular weight was measured to be 90,000 by means of gel permeation chromatography (GPC). This molecular weight is called as "MW(GPC)" hereinafter. This product is PA-1, and the above-described synthesis is Method A.

EXAMPLES 2 TO 7

The same procedures as described in Example 1 were carried out except that phosphines and disulfides shown in Table 1 were employed instead of 52.4 g of triphenylphosphine and 66.4 g of 2,2'-dibenzothiazolyl disulfide. The results are shown in Table 1.

TABLE 1

| Example No. | Phosphine (g) | Disulfide (g) | Yield (g) | (η) (dl/g) | MW(GPC) |
|---|---|---|---|---|---|
| 2 | tri-n-butylphosphine 40.4 | diphenyl disulfide 43.6 | 9.3 | 0.45 | 43,000 |
| 3 | triphenylphosphine 52.4 | 1,1'-bis(4-carboethoxy naphthyl)disulfide 92.4 | 12.3 | 0.72 | 64,000 |
| 4 | diethylphenylphosphine 33.2 | 2,2'dibenzoxazolyl disulfide 60.0 | 23.3 | 0.93 | 85,000 |
| 5 | triphenylphosphine 52.4 | 2,2'-di(5-nitropyridyl) disulfide 62.0 | 24.5 | 0.93 | 87,000 |
| 6 | triphenylphosphine 52.4 | 4,4'-dipyridyl disulfide 44.0 | 20.0 | 0.97 | 91,000 |
| 7 | triphenylphosphine 52.4 | 2,2'-dibenzoimidazolyl disulfide 59.6 | 26.2 | 0.92 | 89,000 |

COMPARATIVE EXAMPLE 1

Into a 300 ml separable flask, 19.8 g of 4,4'-diaminodiphenylmethane, 100 ml of N-methyl-pyrrolidone and 170 g of pyridine were placed, and 20.3 g of isophthalic acid dichloride was added dropwise to the mixture for 15 minutes with stirring under cooling in an ice bath. Following stirring the mixture for 24 hours at 23° C., 5 ml of ethanol was added to the mixture and stirring was continued for 4 hours. The reaction mixture was added dropwise to 10 l of water under stirring to give precipitates. The precipitates were separated by filtration, washed with water and ethanol, and dried under vacuum to give 26.0 g of a white powder. The inherent viscosity (η) of the product measured in the same manner as in Example 1 was 0.85 dl/g. MW(GPC) was 88,000. This product is PA-2.

REFERENCE EXAMPLE 1

Into a 300 ml flask, 100 g of pyromellitic dianhydride and 200 ml of ethanol were placed and the mixture was heated at 70° C. for one hour, and then the mixture was cooled to give crystals. The crystals were obtained by filtration and recrystallized in ethanol to give 44.0 g of pyrolmellitic acid-1,4-diethyl ester. The proton nuclear magnetic resonance spectrum (NMR spectrum) of the compound showed an absorption at δ-values 1.40 (triplet, 6H), 4.40 (quadruplet, 4H), 8.03 (singlet, 2H) and 11.50 (broad, 2H).

EXAMPLE 8

Into a 500-ml separation flask, 31.0 g of pyromellitic acid-1,4-diethyl ester, 40.4 g of tri-n-butylphosphine and 79.6 g of bis(2,4-dinitrophenyl)-disulfide were placed. The solution containing 17.90 g of pyridine and 100-ml of γ-butyrolactone was added dropwise to the mixture for 10 minutes with stirring under cooling in an ice bath. Following that, the solution containing 20.0 g of 4,4'-diaminodiphenylether and 100 ml of γ-butyrolactone were added dropwise for 15 minutes. Following stirring the mixture for 8 hours at 10° C., 5 ml of ethanol was added to the mixture and stirring was continued for 4 hours at 23° C. The reaction mixture was added dropwise to 10 l of isopropanol under stirring to give precipitates. The precipitates were isolated by filtration, washed by isopropanol and dried under vacuum to give 42.0 g of a light red powder. The inherent viscosity (η) of the product measured in N-methylpyrrolidone at a concentration of 1 g/dl at 30° C. was 0.30 dl/g. MW(GPC) was 27,000. This product is method PI-1 and the above-described synthesis method is Method B.

REFERENCE EXAMPLE 2

Into a four-necked flask equipped with a stirrer, a thermometer and a reflux condenser with drying tube 349 g of allyl alcohol and 500 g of 3,3',4,4'-benzophenonetetracaroxylic dianhydride, were placed. The mixture was stirred an oil bath at 200° C. for 3 hours and left standing for cooling. The reaction mixture was evaporated for removing excess allyl alcohol and dried under vacuum to give 674 g of a solid compound. This compound is C-1. The NMR spectrum of the compound C-1 measured in CDCl$_3$ at 100 MHz showed an absorption at δ-values 4.8 (doublet, 4H), 5.1–5.6 (multiplet, 4H), 5.7–6.2 (multiplet, 2H), 7.8–8.5 (multiplet, 6H) and 8.9 (singlet, 2H).

EXAMPLE 9

Into a 200 ml separation flask, 22.2 g of C-1, 71.4 ml of γ-butyrolactone, 9.1 ml of pyridine and 8 g of 4,4'-diaminodiphenyl ether were placed and the mixture was stirred for 30 minutes at 23° C. to give a uniform solution. 16.6 g of diethylphenylphosphine and 56.3 g of bis-penthachlorophenyl disulfide were added to the solution under cooling with the mixture of ice and water. After stirring for 3 hours, 5 ml of ethanol were added to the mixture and stirring was continued for one hour. The reaction mixture was added dropwise to 2 l of methanol with stirring to give precipitates. The precipitates were separated by decantation. The precipitates were dissolved in 186 ml of tetrahydrofuran was dissolved the precipitates, and the solution was added dropwise at 1.5 l of deionized water with stirring to give precipitates. The precipitates were obtained by filtration, left standing for drying and dried under vacuum to give 22.0 g of a red powder. The inherent viscosity (η) of the product measured in N-methylpyrrolidone at a concentration of 1 g/dl at 30° C. was 0.14 dl/g. MW(GPC) was 16,000. This product is PI-2 and the above-described synthesis is Method C.

EXAMPLE 10

Into a 300 ml separation flask, 14.6 g of adipic acid, 13.6 g of m-xylylenediamine and 100 ml of hexamethylphosphorictriamide were placed and 49.4 g of tris(2-dimethylaminoethyl)phosphine and 44.4 g of 2,2'-dipyrimidyl disulfide were added to the mixture with stirring at 23° C. Following stirring the mixture for 24 hours at 23° C., the reaction mixture was added dropwise to 0.01N hydrochloric acid under stirring. The product was filtered, washed with water and dried to give 22.0 g of a white powder. The inherent viscosity ($\eta$) of the powder measured in conc. sulfuric acid at a concentration of 0.5 g/dl at 30° C. was 0.30 dl/g. MW(GPC) was 28,000. This powdery product is PA-3 and the above-described synthesis is Method D.

EXAMPLE 11

Into a 500 ml separation flask, 21.8 g of pyromellitic dianhydride, 27.0 g of 2-hydroxyethyl methacrylate and 200 ml of $\gamma$-butyrolactone were placed and 17.0 g of pyridine were added to the mixture with stirring under cooling in an ice bath. After stirring for 16 hours at 23° C., 16.0 g of 4,4'-diaminodiphenyl ether, were added to the mixture and further 52.4 g of triphenylphosphine and 44.0 g of 2,2'-dipyridyl disulfide were added under cooling in an ice bath for one hour. After stirring for 3 hours under cooling in an ice bath, 5 ml of ethanol were added to the reaction mixture and stirring was continued for one hour. The reaction mixture was added to 10 l of ethanol to give precipitates. The precipitates were washed with ethanol and dried under vacuum to give 48.0 g of a light brown powder. The inherent viscosity ($\eta$) of the powdery product measured in N-methylpyrrolidone at a concentration of 1 g/dl at 30° C. was 0.24 dl/g. MW(GPC) was 14,500. This product is PI-3 and the abovedescribed synthesis is Method E.

COMPARATIVE EXAMPLE 2

Into a 500 ml separation flask, B 21.8 g of pyromellitic dianhydride, 27.0 g of 2-hydroxyethyl methacrylate and 100 ml of $\gamma$-butyrolactone were placed and 33.0 g of pyridine were added to the mixture with stirring under cooling in an ice bath. After stirring for 16 hours at 23° C., 23.8 g of thionyl chloride were added to the mixture at 10°-15° C. over 30 minutes. After the mixture was left standing at 15° C. for one hour, a slurry consisting of 16.0 g of 4,4'-diaminodiphenyl ether and 50 ml of $\gamma$-butyrolactone was added dropwise to the mixture over 30 minutes under cooling in an ice bath. After standing for 2 hours at 15° C., the mixture was combined with 10 ml of ethanol and further left standing for 16 hours at 23° C. to give a solution. The solution was diluted with $\gamma$-butyrolactone in the same amount as the solution and the diluted solution was added dropwise to 10 l of deionized water with stirring to give precipitates. The precipitates were filtered, washed and dissolved in 100 ml of tetrahydrofuran. The solution was added dropwise to 10 l of deionized water to give precipitates. The precipitates were filtered, washed and dried to give 50.0 g of a light yellow powder. The inherent viscosity ($\eta$) of the powdery product measured in N-methylpyrrolidone at a concentration of 1 g/dl at 30° C. was 0.19 dl/g. MW(GPC) was 15,000. This product is PI-4.

EXAMPLE 12

Into a 3 l separation flask, 80.6 g of 3,3',4,4'-benzophenonetetracarboxylic dianhydride, 54.5 g of pyromellitic dianhydride, 529 g of N,N-dimethylacetamide and 116.7 g of 2-hydroxyethyl acrylate were placed and 1.12 g of 1,4-diazabicyclo[2.2.2]octane were added to the mixture with stirring under cooling in an ice bath. After stirring for 16 hours at 23° C., to 90 g of a diaminodiphenyl ether and 332.5 g of 2,2'-dibenzothiazolyl disulfide, were added to the mixture and further the solution containing 262.3 g of triphenylphosphine and 520 g of N,N-dimethylacetamide was added dropwise over 2 hours under cooling in an ice bath. Following stirring the mixture for 2 hours at 6° C., 6 ml of ethanol were added to the mixture and stirring was continued for one hour at 23° C. The reaction mixture was added dropwise to 20 l of methylethylketone under stirring to give a polymer. The polymer was dissolved in 800 ml of methylethylketone and the resultant solution was added dropwise to 10 l of ethanol under stirring to give precipitates. The precipitates were isolated by filtration, washed by ethanol and dried under vacuum to give 220 g of a light yellow powder. The inherent viscosity ($\eta$) of the powdery product measured in N-methylpyrrolidone at the concentration of 1 g/dl at 30 °C. was 0.31 dl/g. MW(GPC) was 24,000. This product is PI-7.

EXAMPLES 13 TO 29

Various polyamides were prepared. Starting materials, synthesis methods and the results are shown in Table 2.

TABLE 2

| Example No. | Dicarboxylic Acid Component | Diamine Component | Synthesis Method | ($\eta$) (dl/g) | MW(GPC) | Product |
|---|---|---|---|---|---|---|
| 13 | additive of BTDA*[1] and 2-HEMA*[2] | DADPE*[3] | E | 0.22 | 16,000 | PI-5 |
| 14 | terephthalic acid | m-phenylenediamine | A | 0.64 | 60,000 | PA-4 |
| 15 | TMME*[4] | hexamethylenediamine | A | 0.41 | 34,000 | PAI-1 |
| 16 | BTDE*[5] | 1,5-diaminonaphthalene | B | 0.32 | 20,000 | PI-6 |
| 17 | 4-carboxy cinnamic acid | ethylenediamine | A | 0.40 | 42,000 | PA-5 |
| 18 | TMME | 4,4'-diaminodiphenyl sulfone | B | 0.25 | 21,000 | PAI-2 |
| 19 | biphenyl-4,4'-dicarboxylic acid | 4,4'-diaminodiphenyl methane | A | 0.31 | 22,000 | PA-6 |
| 20 | hexahydrophthalic acid | piperazine | D | 0.19 | 25,000 | PA-7 |
| 21 | 2,6-pyridine-dicarboxylic acid | hexamethylenediamine | A | 0.40 | 35,000 | |
| 22 | DCMA*[6] | 4,4'-diaminodiphenyl sulfone | B | 0.26 | 23,000 | |
| 23 | additive of pyromellitic dianhydride and N—methylolacrylamide | BAPDS*[7] | E | 0.26 | 20,000 | |
| 24 | additive of BTDA and PATS*[8] | DADPE | E | 0.19 | 20,000 | |

TABLE 2-continued

| Example No. | Dicarboxylic Acid Component | Diamine Component | Synthesis Method | (η) (dl/g) | MW(GPC) | Product |
|---|---|---|---|---|---|---|
| 25 | additive of trimellitic anhydride and 2,3-dimethoxypropanol | m-phenylenediamine | E | 0.34 | 31,000 | |
| 26 | additive of pyromellitic dianhydride and MDAA*[(9)] | DADPE | E | 0.52 | 47,000 | |
| 27 | additive of pyromellitic dianhydride and MTEA*[(10)] | MADPE | E | 0.20 | 19,000 | |
| 28 | P—phenylenediacrylic acid | BPMS*[(11)] | A | 0.22 | 27,000 | |
| 29 | FTP*[(12)] | 2,5-diaminopyridine | A | 0.25 | 28,000 | |

Notes for Table 2
*[(1)] 3,3',4,4'-benzophenonetetracarboxylic dianhydride
*[(2)] 2-hydroxyethyl methacrylate
*[(3)] 4,4'-diamiondiphenyl ether
*[(4)] trimellitic acid monoethyl ester (mixture of 1-ethyl ester and 2-ethyl ester)
*[(5)] 3,3',4,4'-benzophenonetetracarboxylic acid diethyl ester
*[(6)] 3,4-dicarbomethoxy adipic acid
*[(7)] 1,3-bis(3-aminopropyl)tetramethyl disiloxane
*[(8)] 3-phenylaminopropyl trimethoxy silane
*[(9)] 4-(diethylamino)-N—methylaniline
*[(10)] 2-methacrylthio ethanol
*[(11)] p-bis(3-aminopropyldimethylsilyl)benzene
*[(12)] 2,3,5-furantricarboxylic acid-2-(2-pyridyl)ester

EXAMPLE 30

The same procedures as described in Example 11 were carried out except that 3.5 g of p-aminophenylacetylene were used instead of 5 ml of ethanol to give 45.0 g of a light brown powder. The inherent viscosity (η) of the powdery product measured in N-methylpyrrolidone at concentration of 1 d/dl at 30° C. was 0.22 dl/g. MW(GPC) was 14,000. This product is PI-8.

EXAMPLE 31

The same procedures as described in Reference Example 11 were carried out except that 10 ml of diethylamine were used instead of 5 ml of ethanol to give 47.0 g of a light brown powder. The inherent viscosity (η) of the powdery product measured in N-methylpyrrolidone at a concentration of 1 g/dl at 30° C. was 0.24 dl/g. MW(GPC) was 15,000. This product is PI-9.

REFERENCE EXAMPLE 3

Measurement of the concentration of chloride ion:

Polymers obtained in the above-described Examples were dissolved in an organic solvent containing a small amount of sulfuric acid. The concentration of the chloride ion was measured by titrating with aqueous silver nitrate solution while the electric conductivity was measured. The measurement limiting value of this method was about 1 ppm.

PA-2 and PI-4 contained 60 ppm and 80 ppm of chloride ion, respectively. Other polymers except PA-2 and PI-4 contained no chloride ion more than the measurement limiting value.

REFERENCE EXAMPLE 4

Using PI-1 to PI-4, 33% of N-methylpyrrolidone solutions were prepared. Each solution was applied on an aluminum mirror plane freshly prepared by vacuum deposition onto silicon wafer with a thickness of about 4μ by using a spin-coating method, dried at 70° C. and further heated at 400° C. for 30 minutes a N₂ gas atmosphere to form a polyimide film. The film was left standing under 90% humidity at 80° C. for 1000 hours. As a result, no abnormality was observed in PI-1, PI-2 and PI-3. As for PI-4, the aluminum mirror plane was clouded.

A silicon oxide layer was produced on a silicon wafer and 300 aluminum lines, each being 3μ in width and 1μ in thickness, were formed on the surface. On the lines on the surface, a polyimide film was formed by using PI-1, PI-2, PI-3 and PI-4, respectively, in the same manner as described above. The products thus obtained were left standing for 2000 hours at 90% humidity at 80° C. as an electric current of 20 V was applied to the aluminum lines. No abnormality was observed in the products with polyimide films formed by PI-1, PI-2 and PI-3. On the other hand, opening of the line was observed in 14 lines of the product with polyimide film of PI-4.

REFERENCE EXAMPLE 5

In 50 g of N-methylpyrrolidone 25 g of PA-1, 10 g of ethylene glycol diacrylate, 0.1 g of Michler's ketone, 0.5 g of benzophenone and 1.0 g of benzyldimethylketal were dissolved to give a homogeneous solution. The solution was coated on a surface of copper-clad laminate plate (glass epoxy substrate) after polishing up the surface with buff, and dried at 70° C. for 2 hours to form a uniform 40 μm thick film. The film was subjected to exposure through a patterned mask by using an ultra-high pressure mercury lamp (m MW/cm²) for 5 minutes under N₂ gas atmosphere. Subsequently, development was carried out by spraying a mixture consisting of the same amounts of N,N-dimethylacetamide and ethanol to the film for 30 seconds to obtain polyamide patterns. The patterns which were dried under N₂ gas atmosphere at 280° C. for 2 hours had sufficient surface hardness. No abnormality was observed in the patterns even when the patterns were dipped into a solder bath at 260° C. for 10 seconds. This test is called the solder heat-resistance test hereinafter. No abnormality was observed in the copper surface under the film when the patterns were left standing at 85% humidity at 80° C. for 200 hours. This test is called the corrosion test hereinafter.

REFERENCE EXAMPLE 6

The same procedures as described in Reference Example 5 were carried out except that PA-2 was used instead of PA-1 to form polyamide patterns. When the patterns were left standing at 85% humidity at 80° C.

for 200 hours, the copper surface under the film was observed to be cloudy.

REFERENCE EXAMPLE 7-12

Various polyamide patterns were formed by repeating the same procedures as described in Reference Example 5 except: PA-4, PA-5, PA-6, PAI-1, PAI-2 and PI-1 were used, respectively, instead of PA-1. After each pattern was subjected to heat treatment, the patterns were tested in the same manner as in Reference Example 5. The conditions of heat treatment and the results of the tests are shown in Table 3.

TABLE 3

| Reference Ex No. | Polymer | Film Thickness ($\mu$) | Heat Treatment Temperature (°C.) | Time (hr.) | Solder Heat-Resistance Test (Temperature (°C.)) | Corrosion Test |
|---|---|---|---|---|---|---|
| 7 | PA-4 | 35 | 280 | 2 | No abnormality (260° C.) | No abnormality |
| 8 | PA-5 | 30 | 200 | 2 | No abnormality (230° C.) | No abnormality |
| 9 | PA-6 | 40 | 280 | 2 | No abnormality (280° C.) | No abnormality |
| 10 | PAI-1 | 25 | 300 | 2 | No abnormality (320° C.) | No abnormality |
| 11 | PAI-2 | 25 | 350 | 2 | No abnormality (350° C.) | No abnormality |
| 12 | PI-1 | 20 | 140 400 | 2 | No abnormality | No abnormality |

REFERENCE EXAMPLE 13

Each solution prepared in Reference Examples 5, 6, 7 and 9 was left standing at 23° C. to observe the change of the viscosities of the solutions. After 3 days, decrease of the viscosity was observed in the solution prepared in Reference Example 6. No abnormality was observed in other solutions after 7 days passed.

REFERENCE EXAMPLE 14

In 20 g of cyclohexanone were dissolved 20 g of PA-5 and 0.8 g of 2,6-bis(4-azidobenzal)cyclohexane to give a homogeneous solution. The solution was applied on a silicon wafer by using a spin coater and dried at 60° C. for one hour to form a 10 $\mu$m thick film. The film was subjected to exposure through a photomask by using an ultra-high pressure mercury lamp (8 MW/cm$^2$) for 10 seconds. After exposure, development was carried out by using a mixture of cyclohexanone and xylene, followed by drying at 200° C. for 2 hours to give a pattern. The pattern had 10 $\mu$m resolution.

REFERENCE EXAMPLE 15

To a mixed solution consisting of 15 ml of N-methylpyrrolidone and 15 ml of cyclopentanone were added 25 g of PI-2, 1.25 g of pentaerythritol tetra(3-mercaptopropionate), 0.5 g of Michler's ketone, 1.0 g of camphorquinone and 0.125 g of 1-phenyl-5-mercapto-1H-tetrazole to give a homogeneous solution. The solution was applied on a silicon wafer previously treated with 0.5% ethanol solution of "A-187" (product by NUC Silicone Co., Ltd.) by a spin coater with 1000 rpm for 7 seconds, followed by drying at 70° C. for 3 hours to form a uniform film 50 $\mu$m in thickness. The film was subjected to 560 mJ/cm$^2$ exposure by using an ultra-high pressure mercury lamp under N$_2$ gas atmosphere. After exposure, development was carried out by spraying a mixture consisting of the same amount of $\gamma$-butyrolactone and xylene for 30 seconds. When the film was rinsed by spraying xylene for 10 seconds and dried by spraying N$_2$ gas, exposed parts of the film were obtained as patterns. It was confirmed that the patterns had 60 $\mu$m resolution of lines. The patterns were subjected to heat treatment under N$_2$ gas atmosphere at 4000° C. for one hour to form patterns on a 38 $\mu$m thick polyimide film.

REFERENCE EXAMPLE 16

25 g of PI-2, 3.75 g of trimethylolpropane trithioglycolate, 0.5 g of Michler's ketone, 1.0 g of benzil and 0.125 g of 2-mercaptobenzthiazole were dissolved in 44 ml of N-methylpyrrolidone were dissolved in 44 ml of N-methylpyrrolidone to give a homogeneous solution. The solution was applied on a silicon wafer by a spin coater with 2000 rpm for 20 seconds, followed by drying at 70° C. for 30 minutes. The film thus obtained was 4.7 $\mu$m in thickness as measured by TALYSTEP (product by Taylor-Hobson Co., Ltd.). The same procedures of exposure, rinsing and drying in Reference Example 15 were repeated except that development was carried out for 5 seconds instead of 30 seconds. The film thickness was measured by varying exposed density. The value obtained by dividing the film thickness after exposure by that before exposure was called "TD". When Dg[50] and Dg[80] were defined as the exposure amounts of TDZ=0.5 and TD=0.8, respectively, in the film obtained in this reference example, Dg[50] was 60 mJ/cm$^2$ and Dg[80] was mJ/cm$^2$. Further, patterns on the film had 5 $\mu$m resolution of lines.

REFERENCE EXAMPLE 17

To 22 g of N-methylpyrrolidone were added 20 g of PI-8, 0.4 g of Michler's ketone and 0.4 g of 4-azidosulfonylphenylmaleinimide to give a homogeneous solution. The same coating procedures as in Reference Example 15 were repeated by using the solution to form a uniform film of 70 $\mu$m in thickness. The film was subjected to the same treatments as in Reference Example 15 to give a polyimide pattern with 32 $\mu$m in thickness and 60 $\mu$m resolution.

REFERENCE EXAMPLE 18

The thermal decomposition temperature of the patterned polyimide film obtained in Reference Example 17 was measured under N$_2$ gas atmosphere by using a differential thermal balance. The polyimide film showed a thermal decomposition temperature of 440° C.

The same procedures as in Reference Example 17 were carried out except that PI-4 and PI-8 were employed instead of PI-9 to form a patterned polyimide film. The thermal decomposition temperature of the polyimide films made from PI-4 and PI-8 were measured in the same manner as described above to show 430° C. and 450° C.

REFERENCE EXAMPLE 19

PI-8, PI-9 and PI-4 were dissolved in N-methylpyrrolidone, respectively, and each solution was applied on a glass plate, dried and heated udner under A $N_2$ gas atmosphere at 130° C. for one hour, 200° C. for one hour, 300° C. for one hour and 400° C. for one hour to form polyimide films each having a thickness of 30 $\mu$m. The breaking elongation was measured by using the film with 10 mm in width. The polyimide films made from PI-8, PI-9 and PI-4 showed a breaking elongation of 9.5%, 6.0% and 0–4.0%, respectively.

REFERENCE EXAMPLE 20

In a mixed solvent consisting of 15 ml of N-methylpyrrolidone and 15 ml of cyclopentanone 20 g of PI-7, 1.0 g of trimethylolpropane triacrylate, 1.0 g of "Quantacure PDO" (product by Ward Blenkinsop Co., Ltd.) and 0.5 g of Michler's ketone, 0.2 g of 1-phenyl-5-mercapto-1H-tetrazol and 0.02 g of diphenylnitrosoamine were dissolved to give a homogeneous solution. The solution was applied on a silicon wafer previously treated with 0.5% methanol solution of "A-187" (product by NUC Silicone Co., Ltd.) by a spin coater with 2000 rpm over 20 seconds, followed by drying at 70° C. for one hour. The film thus obtained had a thickness of 15 m as measured by a dial gauge. The film was subjected to exposure through a photomask by an ultrahigh pressure mercury lamp (8 MW/cm²) for 15 seconds. After exposure, development was carried out by spraying a mixture consisting of the same amounts of γ-butyrolactone and xylene for 10 seconds. Then, the film was rinsed by spraying xylene for 10 seconds, dried by spraying $N_2$ gas and dried at 70° C. to form a pattern with sufficient surface hardness. The pattern was heated at 140° C. for 2 hours and at 400° C. for 2 hours to form a polyimide pattern having 10 $\mu$m resolution.

REFERENCE EXAMPLE 21

The same procedures as in Reference Example 20 were carried out, except that an aluminum mirror plane freshly prepared by vacuum deposition onto a silicon wafer was used instead of the silicon wafer, PI-3, PI-4 and PI-5 were used as a polymer and the exposure time was 30 seconds, to form polyimide patterns.

The polyimide patterns were left standing under 90% humidity at 80° C. for 1000 hours. No abnormality was observed in the patterns and the aluminium mirror plane under the patterns which were made from PI-3 and PI-5. As for the pattern made from PI-4, cloud was observed on the aluminum mirror plane under the patterns.

Silicon oxide was produced on a silicon wafer and 300 aluminum lines, each having 3$\mu$ in width and 1$\mu$ in thickness, were formed on the surface. On the lines on the surface, the polyimide film was formed by using PI-3, PI-4 and PI-5, respectively, in the same manner as described in Reference Example 20. The products thus obtained were left standing for 2000 hours at 90% humidity at 80° C. as an electric current of 20 V was applied to the aluminum lines. No abnormality was observed in the products with polyimide films formed by PI-3 and PI-5. On the other hand, opening of the line was observed in 29 lines of the product with polyimide film of PI-4.

What is claimed is:

1. A process for preparing a polyamide which comprises polycondensing a dicarboxylic acid with a diamine in contact with a condensing agent composition comprising a combination of at least one organic phosphine and at least one organic disulfide.

2. A process according to claim 1, wherein the polycondensation is a solution polycondensation.

3. A process according to claim 2, wherein the solution polycondensation is carried out in the presence of an aprotic polar solvent.

4. A process according to claim 2, wherein polycondensation is effected at a reaction temperature from −20° C. to 80° C.

5. A process according to claim 1, wherein the molar ratio of the combination of the phosphine and the disulfide to the diamine is 2 or more when the dicarboxylic acid is in excess with respect to the diamine, or the molar ratio of the combination of the phosphine and the disulfide to the dicarboxylic acid is 2 or more when the diamine is in excess with respect to the dicarboxylic acid.

6. A process according to claim 1, wherein the phosphine has the following general formula:

wherein each of $R_1$, $R_2$ and $R_3$ is independently a $C_{1-20}$ alkyl group, a $C_{6-20}$ aryl group, a $C_{7-20}$ arylalkyl group, a $C_{1-20}$ heterocyclic group or a substituted group thereof having at least one substituent selected from the group consisting of $-OZ_1$, $-C\equiv N$ and $-NZ_2Z_3$, wherein each of $Z_1$, $Z_2$ and $Z_3$ is independently a $C_{1-8}$ alkyl group or a $C_{6-14}$ aryl group.

7. A process according to claim 1, wherein the disulfide is an aromatic disulfide.

8. A process according to claim 7, wherein the disulfide is substituted by an electron attractive group.

9. A process according to claim 7, wherein the disulfide is a nitrogen-containing heterocyclic disulfide.

10. A process according to claim 1, wherein the dicarboxylic acid is an aromatic dicarboxylic acid.

11. A process according to claim 1, wherein the dicarboxylic acid has a photosensitive group.

12. A process according to claim 11, wherein the photosensitive group is attached to the position ortho or peri to the carboxyl group through a carboxylic acid ester bond.

13. A process according to claim 1, wherein the diamine is an aromatic diamine.

14. A process according to claim 1, wherein the diamine has at least one silicon atom.

15. A process according to claim 1, which is conducted at a reaction temperature of from −20° C. to 80° C. and wherein the dicarboxylic acid has the following general formula:

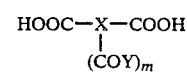

wherein
X is a group having a valence of (m+2), and is a $C_{6-20}$ carbocyclic group, a $C_{3-20}$ heterocyclic group, a $C_{2-20}$ alkyl group or a $C_{2-20}$ alkenyl group;
Y is −OR or −NRR';

each of R and R' is, independently, a substituted $C_{5-20}$ carbocyclic group, a substituted or unsubstituted $C_{1-20}$ heterocyclic group or a substituted or unsubstituted other $C_{1-20}$ hydrocarbon group; any substituent of a substituted group being —OW, —SW, a $C_{2-12}$ acyl group, a $C_{2-12}$ acyloxy group, a $C_{2-12}$ acylthio group, a $C_{2-12}$ acylamino group, a $C_{2-12}$ dialkylamino group or a $C_{3-12}$ group having at least one silicon atom;

W is a $C_{1-12}$ hydrocarbon group;

m is 1 or 2; and

—COY is attached to any of the positions ortho, peri, $\beta$ and $\gamma$ with respect to the —COOH group.

16. A process according to claim 15 wherein Y is —NRR'.

17. A process according to claim 15 wherein the molar ratio of the phosphine to the disulfide is around 1.0, and the molar ratio of the condensing agent to the diamine is at least 2 when the dicarboxylic acid is in excess with respect to the diamine, the molar ratio of the condensing agent to the dicarboxylic acid being at least 2 when the diamine is in excess with respect to the dicarboxylic acid, and the molar ratio of the dicarboxylic acid to the diamine being from 0.7 to 1.3.

18. A polycondensation reaction medium comprising dicarboxylic acid, diamine and condensing agent, and wherein the condensing agent is a combination of at least one phosphine with at least one disulfide.

19. A polycondensation reaction medium according to claim 18 in the form of a solution in a solvent.

20. A polycondensation reaction medium according to claim 19 wherein the solvent is an aprotic polar solvent.

21. An admixture of dicarboxylic acid, diamine and condensing agent in a polycondensation reaction medium wherein the condensing agent is a combination of at least one phosphine with at least one disulfide, and the dicarboxylic acid is of the following formula:

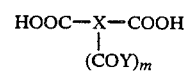

wherein

X is a group having a valence of (m+2), and is a $C_{6-20}$ carbocyclic group, a $C_{3-20}$ heterocyclic group, a $C_{2-20}$ alkyl group or a $C_{2-20}$ alkenyl group;

Y is —OR or —NRR';

each of R and R' is, independently, a substituted $C_{5-20}$ carbocyclic group, a substituted or unsubstituted $C_{1-20}$ heterocyclic group or a substituted or unsubstituted other $C_{1-20}$ hydrocarbon group; any substituent of a substituted group being —OW, —SW, a $C_{2-12}$ acyl group, a $C_{2-12}$ acyloxy group, a $C_{2-12}$ acylthio group, a $C_{2-12}$ acylamino group, a $C_{2-12}$ dialkylamino group or a $C_{3-12}$ group having at least one silicon atom;

W is a $C_{1-12}$ hydrocarbon group;

m is 1 or 2; and

—COY is attached to any of the positions ortho, peri, $\beta$ and $\gamma$ with respect to the —COOH group.

* * * * *